United States Patent
Kaprelian et al.

[11] 4,061,420
[45] Dec. 6, 1977

[54] CATADIOPTRIC LENS SYSTEM

[75] Inventors: Edward K. Kaprelian, Mendham; William E. Mimmack, Morristown, both of N.J.

[73] Assignee: Questar Corporation, New Hope, Pa.

[21] Appl. No.: 683,834

[22] Filed: May 6, 1976

[51] Int. Cl.² .............................................. G02B 17/08
[52] U.S. Cl. .................................... 350/199; 350/200; 350/201
[58] Field of Search .................... 350/199, 200, 201

[56] References Cited
U.S. PATENT DOCUMENTS

| 2,701,983 | 2/1955 | Back et al. | 350/199 |
| 3,490,831 | 1/1970 | Takahashi | 350/201 |

FOREIGN PATENT DOCUMENTS

| 1,068,028 | 5/1967 | United Kingdom | 350/200 |

Primary Examiner—Paul A. Sacher
Attorney, Agent, or Firm—Denny and Patane

[57] ABSTRACT

The invention provides a highly corrected catadioptric telephoto lens comprising in succession, from the long conjugate end, an aspherized negative meniscus corrector plate, a Mangin type primary mirror which directs light to a secondary mirror comprising the central portion of the second surface of the corrector lens, a first positive meniscus corrector lens and a second biconcave corrector lens. The relative aperture is f/8 and the overall length of the system from first vertex to image plane is less than 0.4 focal length.

9 Claims, 4 Drawing Figures

CATADIOPTRIC LENS SYSTEM

BACKGROUND OF THE INVENTION

The present invention relates to catadioptric lenses of relatively long focal length and moderate aperture, and more specifically to a compact, lightweight design characterized by markedly reduced aberrations and high resolving power.

SUMMARY OF THE INVENTION

In order to record distant objects at a scale considerably larger than that obtained with the so called "normal" lens on still, motion picture and television cameras it is necessary to employ an objective lens of long focal length. If this is to be achieved with high resolution and a minimum of lens bulk and weight it is necessary to employ a lens system of the catadioptric type which utilizes the combination of refracting and reflecting optical surfaces.

To achieve these objectives the present invention utilizes a Mangin mirror as its primary mirror, an aspheric corrector plate, the rear surface of which acts as the secondary mirror, and a pair of air spaced corrector lenses located between the primary and secondary mirrors. Care has been taken in the design to fully utilize the advantages of the Mangin mirror as well as that offered by aspherization of the corrector plate, and, in addition, common, readily available glass types have been employed.

The result is a design in which chromatic aberration, the most troublesome of aberrations in long focal length lenses, has been kept at a low level together with astigmatism and distortion. The 700mm focal length example given here covers the standard 24 × 36mm field of 35 mm cameras with excellent imagery, imagery which is substantially diffraction limited over the entire field.

Other features and advantages of the invention will be apparent from the following description and claims and are illustrated in the accompanying drawing which show structure embodying preferred features of the present invention and the principles thereof, and what is now considered to be the best mode in which to apply these principles.

Lenses of this general class are known in the prior art for example in U.S. Pat. Nos. 3,438,695, 3,507,556 and 3,632,190. The present invention differs from the prior art by the use of an aspheric corrector plate, elimination of an additional secondary mirror element and the use of an air spaced positive meniscus-biconcave lens combination for the corrector lenses.

BRIEF DESCRIPTON OF THE DRAWING

In the accompanying drawing focusing a part of the specification:

DETAILED DESCRIPTION

Figure 1:
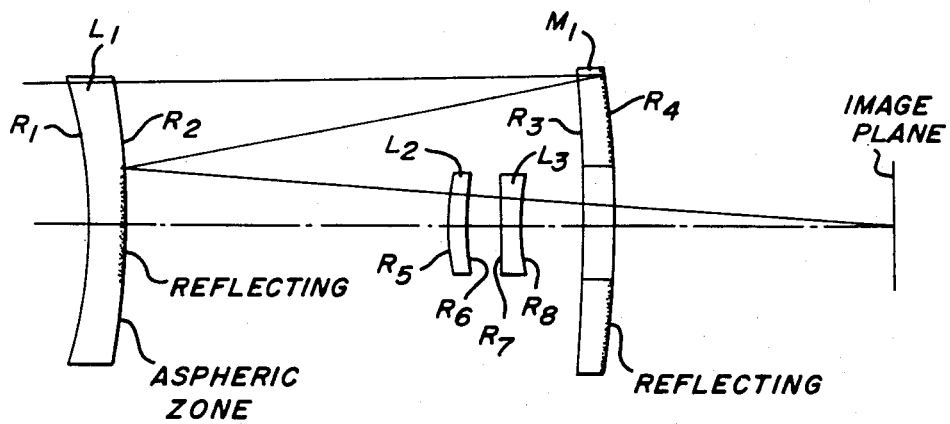
FIG. 1 is a schematic diagram illustrating a preferred embodiment of the lens system of the present invention.

The lens system in FIG. 1 is drawn in accordance with the tables of constructional data shown hereinafter. In these tables the radius of curvature, the lens thickness, the axial distance between the lenses and the glass parameters are specified as $R$ = radius
$t$ = thickness of lens
$s$ = distance between lenses
$n_d$ = refractive index of the glass
$v$ = dispersive index of the glass
$f$ = focal length of the system In conformance with custom in the lens design art, a plus sign accompanying the value for the radius of a surface denotes that the surface is convex to the object and a minus sign denotes that the surface is concave to the object. In these illustrations the object is at the long conjugate end of the system.

The long focal length objective in accordance with the present invention is a catadioptric system consisting of: a negative power aspheric corrector plate $L1$ which also carries the secondary mirror surface; a primary mirror $M_1$ of the Mangin type; a positive meniscus corrector lens $L2$; and a biconcave corrector lens $L3$. Light enters corrector plate $L1$ from the left, is reflected by Mangin mirror $M1$, reflected again at the central reflecting surface of plate $L1$ and passes through corrector lenses $L2$ and $L3$ to reach the image plane.

Analysis of the system indicates that certain dimensional ratios should be maintained if well corrected modification and variations of the lens elements and their arrangements are to be made. For example, the optimum relationship of the first and second radii of the corrector plate has been found to have the following relationship.

$$0.55 < (R_1/R_2 < 0.67$$

In addition, the optimum relationship of the first and second radii of the Mangin mirror has been found to have the following relationship:

$$1.48 < (R_3/R_4 < 1.68$$

It has further been found that power of <3 must be greater than that of <2 by a ratio falling between the limits of 1.8 and 2.3.

The resulting systems, of which two examples are described, have an overall length of approximately 0.4 that of the focal length, and exhibit the high level of correction shown in the diagrams. The arrangement of elements shown diagrammatically in FIG. 1 applies to both examples.

EXAMPLE I

| | $f = 700$ mm | Thickness and Separations | $n_d$ | $v_d$ |
|---|---|---|---|---|
| $L_1$ | $R_1 = -157.5$ | | | |
| | $R_2 = -265.6$ | $t_1 = 13.5$ | 1.5168 | 64.2 |
| $M_1$ | $R_3 = -752$ | $s_1 = 149.7$ | | |
| | $R_4 = -467$ | $t_2 = 11.0$ | 1.5168 | 64.2 |
| $L_2$ | $R_5 = +64.25$ | $s_2 = 109.8$ | | |
| | $R_6 = +140.2$ | $t_3 = 4.5$ | 1.5234 | 51.5 |
| $L_3$ | $R_7 = -228.3$ | $s_3 = 11.6$ | | |
| | $R_8 = +85.9$ | $t_4 = 6.7$ | 1.5234 | 51.5 |
| | | $t_4 = 120.3$ | | |

The thickness of glass to be removed from the second surface of lens $L1$ (denoted $R2$) in wavelengths of helium d light at various distances from the lens vertex is

| radius | | radius | |
|---|---|---|---|
| 5mm | 0.006 | 30mm | 8.51 |
| 10mm | 0.10 | 35mm | 15.91 |
| 15mm | 0.52 | 40mm | 27.40 |
| 20mm | 1.65 | 45mm | 44.37 |
| 25mm | 4.08 | 45.43mm | 46.14 |

EXAMPLE II

| | f = 700mm | Thickness and Separation | $n_d$ | $v_d$ |
|---|---|---|---|---|
| $L_1$ | $R_1 = -144.4$ | | | |
| | | $t_1 = 13.5$ | 1.5168 | 64.2 |
| | $R_2 = -233.85$ | | | |
| | | $s_1 = 139.3$ | | |
| $M_1$ | $R_3 = -633.7$ | | | |
| | | $t_2 = 11.05$ | 1.5168 | 64.2 |
| | $R_4 = -432.5$ | | | |
| | | $s_2 = 108.52$ | | |
| $L_2$ | $R_5 = +56.59$ | | | |
| | | $t_3 = 4.5$ | 1.5234 | 51.5 |
| | $R_6 = +128.78$ | | | |
| | | $s_3 = 13.53$ | | |
| $L_3$ | $R_7 = -182.55$ | | | |
| | | $t_4 = 6.7$ | 1.5234 | 51.5 |
| | $R_8 = +73.45$ | | | |
| | | $s_4 = 110.0$ | | |

The thickness of the glass to be removed from the second surface of lens L, (denoted $R2$) in this example, in wavelengths of helium d light at various distances from the lens vertex is

| radius | | radius | |
|---|---|---|---|
| 5mm | 0.0087 | 30mm | 11.57 |
| 10mm | 0.139 | 35mm | 21.00 |
| 15mm | 0.708 | 40mm | 37.40 |
| 20mm | 2.25 | 45mm | 60.71 |
| 25mm | 5.53 | 45.43mm | 63.13 |

Figure 2:
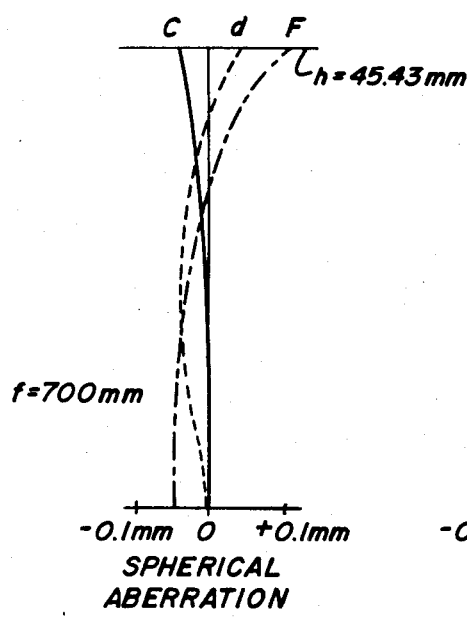
FIG. 2 is a diagram showing the spherical and chromatic aberration curves.
Figure 3:
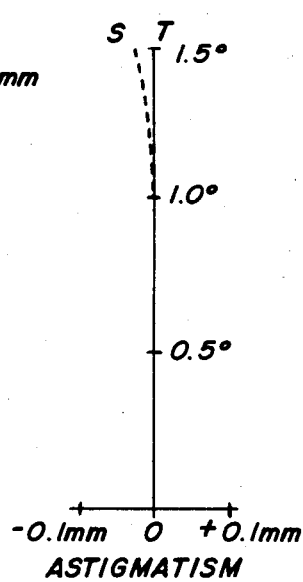
FIG. 3 is a diagram showing the astigmatic curve.
Figure 4:
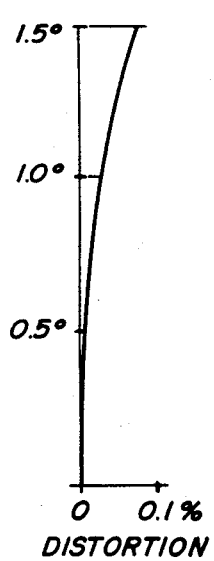
FIG. 4 is a diagram showing distortion.

FIGS. 2, 3 and 4 show the aberration curves for Example I, chosen here because its corrector plate requires somewhat less aspherization than example II, the aberration curves for which are almost identical with that of Example I.

It can be seen from FIG. 2 that at full aperture the maximum spread for C, d and F lines, is 0.16mm or 0.023% of the 700mm focal length. FIG. 23 shows that the tangential image plane is flat over the entire field while the sagital field has moved in less than 0.03mm at the edge of the field and for ⅔ of the field coincides with the tangential field. FIG. 4 shows the maximum distortion, occurring at the edge of the field, to be approximately 0.07%. It is apparent from these figures that the catadioptric lens built to the formulation shown herein is, for all practical purposes, free from chromatic aberration, astigmatism, coma and distortion.

The two types of optical glass used have been selected because of the low cost, ready availability, high chemical stability and relatively low specific gravity. It will be obvious to those skilled in the art that the system of the present invention is adaptable for use with other glasses, and that other modifications and variations of the systems set forth are possible within the scope of the invention and the following claims.

What is claimed is:

1. A catadioptric objective comprising an aspheric negative meniscus corrector plate concave to the long conjugate, a primary mirror of the Mangin type spaced from said corrector plate and receiving light transmitted therethrough, a secondary mirror comprising a reflective area at the center of the second surface of said corrector plate and receiving light reflected from said primary mirror, and a spaced apart pair of corrector lenses located between said primary and secondary mirror for receiving light from the latter, said pair of corrector lenses comprising a positive meniscus lens convex to received light and a biconcave lens.

2. A catadioptric objective as claimed in claim 1, the ratio of the first and second radii of the corrector plate falling in the range between 0.59 and 0.62.

3. A catadioptric objective as claimed in claim 1, the ratio of the first and second radii of the Mangin mirror falling in the range between 1.47 and 1.61.

4. A catadioptric objective as claimed in claim 1, the ratio of power between the second, biconcave, corrector lens and the first, meniscus, corrector lens falling in the range between 1.90 and 1.93.

5. A catadioptric objective lens comprising a negative meniscus lens ($L1$) having its concave surfaces facing the long conjugate and having an aspherized second surface, a primary mirror ($M1$) of the Mangin type with a central portion cut away to allow the unaltered passage of light and having a rear surface of shorter radius than the front surface, a secondary mirror comprising a reflective central portion of the second surface of the corrector plate, a first corrector lens ($L2$) between said primary and secondary mirrors comprising a positive meniscus lens, and a second corrector lens ($L3$) between said primary and secondary mirrors and spaced from said first corrector lens, said second corrector lens comprising a biconcave lens of greater absolute power than said meniscus corrector lens.

6. A catadioptric objective lens as claimed in claim 5 said corrector plate and said primary mirror being constructed of the same glass.

7. A catadioptric objective lens as claimed in claim 5 said meniscus corrector lens and said biconcave corrector lens being constructed of the same glass.

8. A catadioptric objective as claimed in claim 5, wherein the elements referred to in claim 5 have the following numerical values.

| | f = 700mm | Thickness and Separations | $n_d$ | $v_d$ |
|---|---|---|---|---|
| $L_1$ | $R_1 = -157.5$ | | | |
| | | $t_1 = 13.5$ | 1.5168 | 64.2 |
| | $R_2 = -265.6$ | | | |
| | | $s_1 = 149.7$ | | |
| $M_1$ | $R_3 = -752$ | | | |
| | | $t_2 = 11.0$ | 1.5168 | 64.2 |
| | $R_4 = -467$ | | | |
| | | $s_2 = 109.8$ | | |
| $L_2$ | $R_5 = +64.25$ | | | |
| | | $t_3 = 4.5$ | 1.5234 | 51.5 |
| | $R_6 = +140.2$ | | | |
| | | $s_3 = 11.6$ | | |
| $L_3$ | $R_7 = -228.3$ | | | |
| | | $t_4 = 6.7$ | 1.5234 | 51.5 |
| | $R_8 = +85.9$ | | | |
| | | $t_4 = 120.3$ | | |

Where $R2$ is aspheric through the removal of glass in wavelengths of helium d light at various distances from the lens vertex as indicated

| radius | | radius | |
|---|---|---|---|
| 5mm | 0.006 | 30mm | 8.51 |
| 10mm | 0.10 | 35mm | 15.91 |
| 15mm | 0.52 | 40mm | 27.40 |
| 20mm | 1.65 | 45mm | 44.37 |
| 25mm | 4.08 | 45.43mm | 46.14 |

9. A catadioptric objective lens as claimed in claim 5 wherein the elements referred to in claim 5 have the following numerical values

| | $f = 700$ mm | Thickness and Separation | $n_d$ | $v_d$ |
|---|---|---|---|---|
| $L_1$ | $R_1 = -144.4$ | | | |
| | | $t_1 = 13.5$ | 1.5168 | 64.2 |
| | $R_2 = -233.85$ | | | |
| | | $s_1 = 139.3$ | | |
| $M_1$ | $R_3 = -633.7$ | | | |
| | | $t_2 = 11.05$ | 1.5168 | 64.2 |
| | $R_4 = -432.5$ | | | |
| | | $s_2 = 108.52$ | | |
| $L_2$ | $R_5 = +56.59$ | | | |
| | | $t_3 = 4.5$ | 1.5234 | 51.5 |
| | $R_6 = +128.78$ | | | |
| | | $s_3 = 13.53$ | | |
| | $R_7 = -182.55$ | | | |

-continued

| | $f = 700$ mm | Thickness and Separation | $n_d$ | $v_d$ |
|---|---|---|---|---|
| $L_3$ | | $t_4 = 6.7$ | 1.5234 | 51.5 |
| | $R_8 = +73.45$ | | | |
| | | $s_4 = 110.0$ | | | where $R_2$ is aspheric through the removal of glass in wavelengths of helium d light at various distances from the lens vertex as indicated

| radius | | radius | |
|---|---|---|---|
| 5mm | 0.0087 | 30mm | 11.57 |
| 10mm | 0.139 | 35mm | 21.00 |
| 15mm | 0.708 | 40mm | 37.40 |
| 20mm | 2.25 | 45mm | 60.71 |
| 25mm | 5.53 | 45.43mm | 63.13 |

* * * * *